Patented Dec. 4, 1945

2,390,368

UNITED STATES PATENT OFFICE 2,390,368

PRODUCTION OF PARA-DIVINYLBENZENE

Carroll A. Hochwalt, Dayton, Ohio, assignor to Monsanto Chemical Company, a corporation of Delaware No Drawing. Application February 11, 1943,
Serial No. 475,592

10 Claims. (Cl. 260—669)

This invention relates to the production of para-divinylbenzene. More particularly the invention pertains to a method of preparing pure para-divinylbenzene from ethylbenzene.

It has heretofore been proposed to prepare para-divinylbenzene by dehydrogenation, i. e., cracking, of para-diethylbenzene. Such a method, however, is impracticable for the production of pure para-divinylbenzene because pure para-diethylbenzene is separable only with difficulty from its isomers. Products obtained by cracking commercially available para-diethylbenzene consist of mixtures of the isomeric divinylbenzenes due to the presence of ortho- and meta-diethylbenzene in the initial material; moreover, they are also contaminated with other pyrolytic products such as the ethylstyrenes which are likewise removable only with extreme difficulty.

I have now found that ethylbenzene may easily and efficiently be converted into pure para-divinylbenzene by a method comprising initial Friedel-Crafts acetylation of ethylbenzene to yield para-ethylacetophenone, liquid phase catalytic oxidation of the mono-ketone to yield para-diacetylbenzene, hydrogenation of the diketone to give the dicarbinol, para-bis(alpha-hydroxyethyl)benzene, and dehydration of the latter to para-divinylbenzene, substantially according to the following series of reactions:

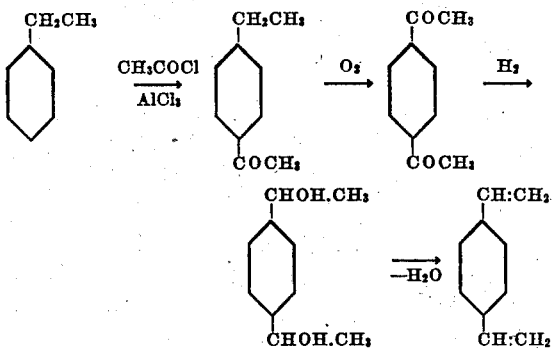

The above series of reactions are advantageously suited to the production of pure para-divinylbenzene because each of the intermediate products is readily obtained in pure form; hence the final product contains neither isomeric divinylbenzenes nor any other impurities. The reactions are all effected at comparatively low temperatures and, except with the Friedel-Crafts reaction, mild catalysts are employed. At no time is there opportunity for rearrangement, cracking, or any other side-reaction which would result in the production of an impure para-divinylbenzene.

Inasmuch as pure para-divinylbenzene confers to resinous products into which it is incorporated advantageous properties which are not obtainable by the use of the crude divinylbenzene mixtures obtainable in cracking operations, the provision of an economical, commercially feasible process for the production of pure para-divinylbenzene is of great importance to the art.

It is therefore an object of the present invention to provide a method of preparing pure para-divinylbenzene on a commercially practicable scale.

Another object of this invention is to provide a method of preparing para-diacetylbenzene from para-ethylacetophenone.

Yet another object of this invention is to provide an improved method for the hydrogenation of para-diacetylbenzene to para-bis(alpha-hydroxyethyl)benzene.

A further important object of this invention is to provide a method of preparing para-divinylbenzene from para-bis(alpha-hydroxyethyl)benzene.

Other and further objects of the present invention will be hereinafter disclosed.

Para-diacetylbenzene has not been hitherto readily prepared. According to the older literature, it is available from either terephthalyldiacetic ester, $C_6H_4(CO.CH_2.CO_2C_2H_5)_2$, or from terephthalyl dimalonic ester,

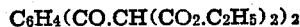
$C_6H_4(CO.CH(CO_2.C_2H_5)_2)_2$

Both of these esters are obtainable only with difficulty. Moreover, according to Ruggli and Gassenmeir (Helv. chim. acta. 22, 501 (1939)) the conversion of terephthalyldiacetic ester into para-diacetylbenzene can be effected in only a 10–15% yield.

According to the process of the present invention, however, I am able to obtain para-diacetylbenzene in at least a 65% yield by liquid phase oxidation of para-ethylacetophenone.

Ingle (Ber. 27, 2527 (1894)) has reported that hydrogenation of para-diacetylbenzene with sodium amalgam yields bis(alpha-hydroxyethyl)benzene. However, he evidently was unable to obtain a pure compound for his product was a liquid which decomposed upon distillation. More recently, the compound was obtained in a pure form, M. P. 81°, by Deluchat (Comptes rendus 190, 440 (1930)), by a Grignard reaction which involved the condensation of phthalic para-dialdehyde with methyl magnesium bromide. The method of Deluchat, however, is of little commercial interest; not only is the phthalic para-dialdehyde (prepared from para-xylene tetrabromide) a very difficultly isolated compound, but also the use of a Grignard reagent does not recommend it as a technically feasible method.

I have found, however, that pure para-bis(alpha-hydroxyethyl)benzene may be readily obtained in substantially quantitative yields by catalytic hydrogenation of para-diacetylbenzene, for example in the presence of a copper chromite catalyst.

The conversion of para-bis(alpha-hydroxyethyl)benzene to para-divinylbenzene has already been effected in a two-stage reaction by Lespieau and Deluchat (Comptes rendus, 190, 683 (1930)). These investigators first prepared an bromohydrin by reacting the dialcohol with phosphorus tribromide, and then converted the bromohydrin into para-divinylbenzene by distillation in the presence of an excess of quinoline. I have found, however, that I can effect a substantially theoretical conversion of the para-bis(alpha-hydroxyethyl)benzene into para-divinylbenzene without rearrangement by merely heating the dialcohol at increased temperatures in the presence of a dehydrating catalyst such as activated alumina.

The preparation of pure para-divinylbenzene from ethylbenzene according to the process of the present invention is further illustrated, but not limited, by the following example:

*Preparation of para-ethylacetophenone.*—Ethylbenzene was reacted with a slight excess of the equimolar quantity of acetyl chloride in the presence of a slight molar excess of anhydrous aluminum chloride. Reaction was effected in carbon tetrachloride solution for 4 hours at a temperature not exceeding 24° C. A 64% yield of para-ethylacetophenone was obtained.

Other acetylating agents may likewise be used. Acetyl halides such as acetyl bromide, fluoride or iodide may be employed, as well as acetic anhydride. When using carbon tetrachloride as a solvent, the temperature may conveniently be maintained at about room temperature by effective cooling in order to prevent reaction of carbon tetrachloride. Other solvents such as petroleum ether or hexane may be employed in which case a somewhat higher temperature may be used. When such a solvent is employed the reaction temperature should be held below about 50° C. in order to avoid dealkylation of ethylbenzene.

*Preparation of para-diacetylbenzene.*—Para-ethylacetophenone was oxidized by means of air in the presence of a catalyst comprising 73% chromium sesquioxide ($Cr_2O_3$) and 27% of calcium carbonate. Into a 2000 cc. round-bottomed, three-necked flask there was placed 948 grams of para-ethylacetophenone, 11 grams of finely ground chromium sesquioxide and 4 grams of calcium carbonate. In one neck of the reaction flask there was placed a thermometer, in the middle neck an alundum thimble gas disperser, and in the third neck a Dean and Stark water trap to which were attached two condensers, one of which was placed above the trap and the other leading from the first condenser to a 500 cc. suction flask. Air, first passed through a sulfuric acid gas scrubber, was brought into the reaction flask through the gas disperser by means of suction applied at the exit end. Air was passed through the reaction mixture maintained at a temperature of from 135° C. to 145° C., for a period of 28 hours. During the reaction, 26 cc. of water was collected in the trap. Upon cooling, the reaction mixture solidified in the flask. Approximately 4 liters of benzol were added to the reaction mixture in order to dissolve it. The resulting solution was filtered and washed well with an aqueous solution of sodium carbonate, sodium hydroxide was added just to the point of alkalinity, and the whole was washed with water. The product was then dried over anhydrous sodium carbonate and filtered. Benzene was removed by distillation under a pressure of 250 mm. Further fractionation gave 401 grams of unreacted para-ethylacetophenone and 390.4 grams of para-diacetylbenzene, B. P. 115–120° C./2 mm. and M. P. 111–112° C. A 65% yield of para-diacetylbenzene, based on the unrecovered para-ethylacetophenone, was obtained.

Oxidation catalysts comprising metal oxides such as chromium sesquioxide, cobalt hydroxide, vanadium pentoxide, cerium dioxide, manganese dioxide, cupric oxide or hydroxide, either alone or in mixtures of the above with or without calcium carbonate may also be employed.

When operating under substantially atmospheric pressure a convenient temperature of oxidation will be the boiling point of the compound and either air or oxygen gas may be employed for oxidation. At higher temperatures which may be attained by the application of pressure to the reacting solution milder oxidizing catalysts such as manganese dioxide or cupric oxide may advantageously be employed, or the oxidizing influence may be mitigated by diluting the oxygen containing gas with inert gases. Temperatures as high as 175° C. or 225° C. may be employed. In any event the temperature and catalyst should be chosen to avoid a material oxidation to acids and aldehydes.

*Preparation of para-bis(alpha-hydroxyethyl)-benzene.*—Para-diacetylbenzene was reduced with hydrogen at 2,000 p. s. i. and 150° C.–160° C. in the presence of a copper chromite catalyst. 230 grams of the para-diketone and 10.9 grams of the copper chromite catalyst were placed into an autoclave at an initial hydrogen pressure of 1,520 p. s. i. and a temperature of 18° C. The autoclave was heated and the temperature was slowly allowed to rise to 159° C. Hydrogen was added intermittently whenever the pressure fell below 900 lbs. The autoclave was allowed to attain room temperature while standing for approximately 18 hours. The product was then removed from the autoclave by solution in 95% ethyl alcohol, and the resulting solution was filtered while warm in order to remove the catalyst. The alcohol was then separated by distillation under vacuum and there was obtained as residue 230 grams (substantially a theoretical yield) of the white, crystalline, para-bis(alpha-hydroxyethyl)benzene, M. P. 79–81° C.

Other known hydrogenation catalysts may also be utilized. If, however, catalysts such as Raney nickel or platinum or palladium be employed care should be exercised that the conditions employed are not so severe that hydrogenation takes place in the aromatic nucleus or that the ketone is reduced to the hydrocarbon. Using the copper chromite catalyst, little danger of such excessive hydrogenation will be encountered, at least at temperatures below about 160° C.–165° C.

*Conversion of para-bis(alpha-hydroxyethyl)-benzene to para-divinylbenzene.*—Conversion was effected in a silica tube, having an internal diameter of 27/32″ and filled to a depth of 12″ with activated alumina. 68 grams of molten para-bis(alpha-hydroxyethyl)benzene was charged dropwise to the tube containing the activated alumina at a temperature of 300° C.±10° C. at a total pressure of 100 mm. over an interval of approximately 1 hour. At the end of this time two 50 cc. portions of benzene were then charged through the tube in order to wash out last traces of product. The benzene solution of the total product, after the addition of a small amount of tert-butylcatechol as inhibitor, was then distilled under partial vacuum. There was thus obtained 43 grams of para-divinylbenzene, B. P. 46–49° C./1-2 mm., and $n_D^{25}$ 1.5835, crystalline at room temperature, together with some unconverted para - bis(alpha - hydroxyethyl) benzene. This represents an 81% yield of para-divinylbenzene, based on the unrecovered para-bis(alpha-hydroxyethyl) benzene.

The dehydration reaction may likewise be carried out upon other types of catalysts. Generally inert masses of large surface are preferred and particularly silica, silica gel, minerals or glass fragments may be employed. Metals should be avoided. Temperatures should be above 250° C. and below temperatures at which thermal cracking takes place. Temperatures in the neighborhood of 290° C. to 310° C.–320° C. have been found to give good yields of para-divinylbenzene.

Dehydration should be effected in the vapor phase. It is accordingly possible to vaporize the para-bis(alpha-hydroxy ethyl) benzene and pass the vapors therefrom over and through the dehydrating catalyst. Better results are obtained by flashing the para - bis(alpha - hydroxy ethyl) - benzene into a vapor by dropping upon a heated surface, in such a manner that the flash evaporation thereof takes place at pressures below atmospheric. Pressures of from 50 mm. to 250 mm. pressure absolute, i. e. from $\frac{1}{15}$ to about $\frac{1}{3}$ of an atmosphere are preferably used.

What I claim is:

1. A process for making para-divinylbenzene which comprises acetylating ethylbenzene in the presence of a Friedel-Crafts catalyst, oxidizing the resulting acetylethylbenzene by means of oxygen to diacetylbenzene, reducing the resulting diacetylbenzene to para-bis(alpha-hydroxyethyl) benzene, and then dehydrating the para-bis-(alpha-hydroxyethyl) benzene in the vapor phase to para-divinylbenzene.

2. The process defined in claim 1, in which the ethylbenzene is acetylated by means of an acetyl halide at a temperature below about 24° C. in the presence of aluminum chloride.

3. The process defined in claim 1, in which the acetylethylbenzene is oxidized while in the liquid phase by means of oxygen in the presence of metal oxide catalysts.

4. The process defined in claim 1, in which the diacetylbenzene is hydrogenated by means of gaseous hydrogen in the presence of a hydrogenating catalyst.

5. The process defined in claim 1, in which the para-bis(alpha-hydroxyethyl) benzene is dehydrated to para-divinylbenzene at an elevated temperature in the presence of a dehydrating catalyst.

6. A process for making para-divinylbenzene which comprises acetylating ethylbenzene by treatment with acetyl chloride in the presence of aluminum chloride to produce para-ethyl acetophenone, treating the para-ethyl acetophenone in the liquid phase by means of oxygen in the presence of a chromium oxide catalyst, to produce diacetylbenzene, treating said diacetylbenzene by means of gaseous hydrogen in the presence of a copper chromite catalyst to produce para-bis(alpha-hydroxyethyl) benzene, and thereupon exposing said para-bis(alpha-hydroxyethyl)-benzene in the vapor phase to a dehydrating catalyst at an elevated temperature to produce para-divinylbenzene.

7. The process defined in claim 6, in which the treatment of ethylbenzene with acetyl chloride in the presence of aluminum chloride is carried out at a temperature below 24° C.

8. The process defined in claim 6, in which the treatment of para-ethyl acetophenone with oxygen in the presence of a chromium oxide catalyst is carried out by means of air at substantially atmospheric pressure and at a temperature below about 145° C.

9. The process defined in claim 6, in which the treatment of the diacetyl benzene by means of hydrogen is carried out at superatmospheric pressure and at a temperature of about 159° C.

10. The process defined in claim 6, in which the para-bis(alpha-hydroxyethyl) benzene is exposed to a dehydrating catalyst comprising aluminum oxide at a temperature in the neighborhood of 300° C.

CARROLL A. HOCHWALT.